(12) United States Patent
Arogunmati

(10) Patent No.: US 11,375,279 B2
(45) Date of Patent: Jun. 28, 2022

(54) PROJECTING TELEVISION PARAMETERS ONTO 2D SPACE FOR DAYPART COMPETITOR ANALYSIS

(71) Applicant: Viacom International Inc., New York, NY (US)

(72) Inventor: Adeyemi Arogunmati, Brooklyn, NY (US)

(73) Assignee: VIACOM INTERNATIONAL INC., New York, NY (US)

(*) Notice: Subject to any disclaimer, the term of this patent is extended or adjusted under 35 U.S.C. 154(b) by 121 days.

(21) Appl. No.: 16/745,092

(22) Filed: Jan. 16, 2020

(65) Prior Publication Data

US 2021/0227294 A1 Jul. 22, 2021

(51) Int. Cl.
*H04N 21/462* (2011.01)
*H04N 21/45* (2011.01)
*H04N 21/81* (2011.01)
*H04N 21/482* (2011.01)
*G06N 3/08* (2006.01)
*G06N 3/04* (2006.01)

(52) U.S. Cl.
CPC ..... *H04N 21/4622* (2013.01); *H04N 21/4532* (2013.01); *H04N 21/482* (2013.01); *H04N 21/812* (2013.01); *G06N 3/0454* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 2020/0082019 A1* | 3/2020 | Allen | H04N 21/25891 |
| 2021/0092493 A1* | 3/2021 | Codenie | H04H 60/16 |
| 2021/0150728 A1* | 5/2021 | Ahmed | G06N 3/08 |

* cited by examiner

*Primary Examiner* — Omar S Parra
(74) *Attorney, Agent, or Firm* — Fay Kaplun & Marcin, LLP

(57) ABSTRACT

A system and method for determining a similarity measure between a first network broadcast time segment and a second network broadcast time segment. The method includes generating first training data comprising groupings of similar broadcast networks and groupings of dissimilar broadcast networks, extracting second training data comprising audience data and genre data for time segments of network broadcasts, and training an encoder neural network based on the first and second training data. The method includes executing the trained neural network with input data comprising the first network broadcast time segment and determining a similarity measure relative to the second network broadcast time segment.

18 Claims, 3 Drawing Sheets

PROJECTING TELEVISION PARAMETERS ONTO 2D SPACE FOR DAYPART COMPETITOR ANALYSIS

BACKGROUND

The dayparting process divides the television broadcast day into several segments, where content is aired based on the viewing habits of the target audience for that segment. For example, morning shows generally air between e.g. 7 am and 10 am, while popular scripted programs generally air between e.g. 7 pm and 10 pm (primetime). Networks have a degree of similarity with respect to the type of content aired over the course of the day. For example, Nickelodeon® and Cartoon Network® may air content with a high degree of similarity while MTV® and History Channel® may air content with a low degree of similarity. Determining the degree of similarity between network dayparts may provide valuable information to the networks themselves, ad sellers, or other entities.

Traditional approaches for determining content similarity include audience demographic and genre duration differencing or proportioning and the use of vector cosine similarity. The existing differencing methods are highly subjective and therefore depend on the judgment of the analyst. Cosine similarity is a more objective method but compares only two entries at a time.

SUMMARY

The present disclosure is directed to a method comprising generating first training data comprising groupings of similar broadcast networks and groupings of dissimilar broadcast networks and extracting second training data comprising audience data and genre data for time segments of network broadcasts. The method further comprises training an encoder neural network based on the first and second training data and executing the trained neural network with input data comprising at least a first network broadcast time segment. The method further comprises determining a similarity measure between the first network broadcast time segment and a second network broadcast time segment.

The present disclosure is further directed to a system comprising a memory storing first training data comprising groupings of similar broadcast networks and groupings of dissimilar broadcast networks and second training data comprising audience data and genre data for time segments of network broadcasts. The system further comprises a processor training an encoder neural network based on the first and second training data, executing the trained neural network with input data comprising at least a first network broadcast time segment, and determining a similarity measure between the first network broadcast time segment and a second network broadcast time segment.

DETAILED DESCRIPTION

Figure 1:
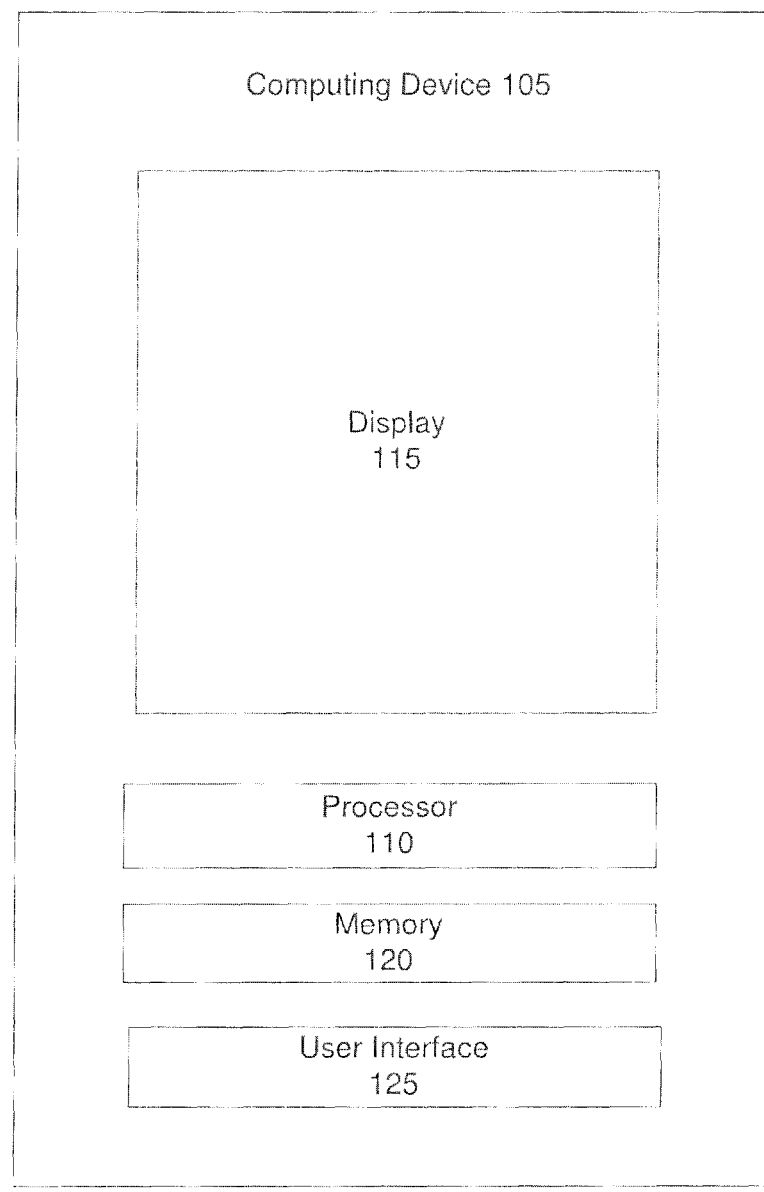
FIG. 1 shows a system for content comparison and similarity determination according to various exemplary embodiments of the present disclosure.

The exemplary embodiments may be further understood with reference to the following description and the related appended drawings, wherein like elements are provided with the same reference numerals. The exemplary embodiments relate to a system and method for determining a similarity of content and viewership data and visualizing the degree of similarity. The exemplary embodiments include a dimensionality reduction for high dimensional input data, particularly an audience demographic distribution and a genre hour distribution, into a 2-dimensional space where broadcasting segments, e.g. dayparts, are compared for similarity. The output of the exemplary method may be a 2D plot where similar segments are mapped to the plot at short Euclidean distances from each other and dissimilar dayparts are mapped to the plot at long Euclidean distances from each other. Notably, any number of networks and their respective dayparts can be compared using this method, with the output plot providing an easy interpretation for multiple entries. Although the exemplary embodiments will be described with respect to television broadcast comparisons, other media content such as radio and digital may be compared in a similar manner.

FIG. 1 shows a system 100 for content comparison and similarity determination according to various exemplary embodiments of the present disclosure. The system 100 includes a computing device 105 comprising a processor 110 for executing a neural network and projecting daypart audience and genre data onto a two-dimensional plot where similar segments are mapped to the plot at short Euclidean distances from each other and dissimilar dayparts are mapped to the plot at long Euclidean distances from each other. The system 100 includes a display 115 for presenting the plot to a user. The system 100 includes a memory 120 for storing broadcast data. The memory 120 may comprise a database of network audience and genre distribution data for all networks and programs broadcast thereon. For example, the database may comprise Nielsen® data. The database may include multiple databases. The memory 120 may store the e.g. Nielsen data directly, or the device 105 may access the data from a remote storage. The system includes a user interface 125 for e.g. inputting the network dayparts to be run through the neural network and compared for similarity.

Figure 2:
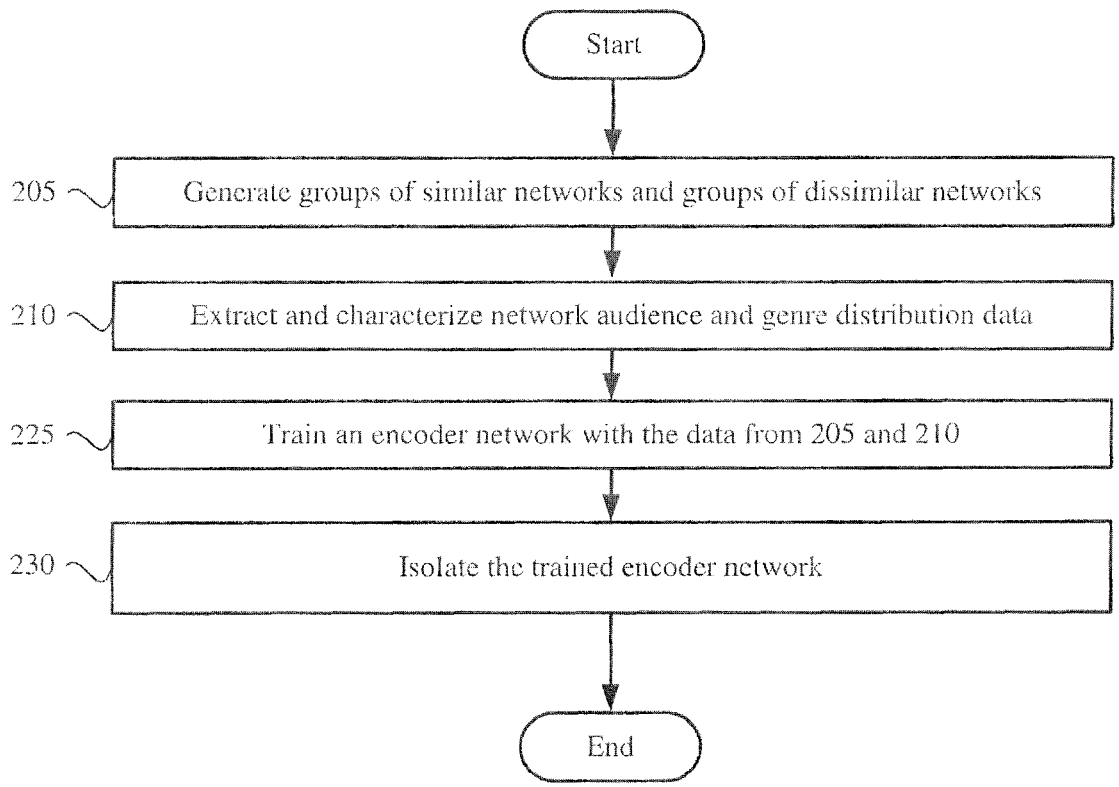
FIG. 2 shows a method for training an encoder network for generating a content similarity comparison for network dayparts according to various exemplary embodiments of the present disclosure.

FIG. 2 shows a method 200 for training an encoder network for generating a content similarity comparison for network dayparts according to various exemplary embodiments of the present disclosure.

In 205, groups of similar networks and groups of dissimilar networks are generated as training data. The groupings may be manually generated. For example, similar networks such as CNN® and MSNBC®, Nickelodeon® and Cartoon Network®, etc., may be grouped based on their traditional recognition of similarity, and networks such as CNN® and Golf Channel®, MTV® and History Channel®, etc., may be grouped together based on their traditional recognition of dissimilarity. In another embodiment, the groupings are generated based on a comparison of network program genres over time segments. For example, two networks are paired as similar when greater than a predetermined percentage of their programming genres overlap, or as dissimilar when fewer than a predetermined percentage of their programming genres overlap. A combination of human judgment and data analysis may be used to generate the similar/dissimilar pairs. In the exemplary embodiment described herein, 460 pairs are generated to train the model. However, greater or fewer than 460 pairs may be used.

In 210, network audience and genre data is extracted as distribution data for all programs and all networks as additional training data and characterized using similarity descriptors. The data, including e.g., program genre, audience age, audience demographics, audience location, etc., may be stored on and extracted from the memory 120 and may be e.g. Nielsen® data, data from another programming measurement entity, or internal programming measurement data. The data is extracted as n-dimensional vectors comprising a number of similarity descriptors, e.g., 62 descriptors. The similarity descriptors are determined by computing feature contribution weights (coefficients) in a logistic regression designed to detect similar networks regardless of daypart. Features with high magnitude weights (positive or negative) had considerable contribution towards similarity status. The similarity descriptors are more indicative of the fine-grained characteristics of the programming than any other set of descriptors.

In 215, the training data from steps 205 and 210 is fit to a neural network to train the neural network. The neural network may be, for example, a Siamese neural network built with an encoder network that reduces the number of data dimensions to two, where the defining characteristics responsible for differentiating networks is found.

Figure 3:
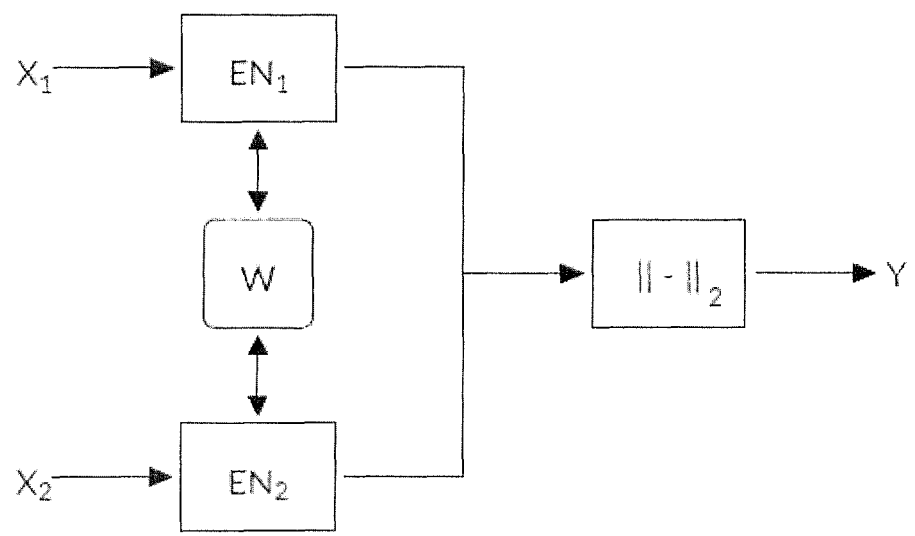
FIG. 3 shows an exemplary Siamese neural network diagram.

As would be known to a person skilled in the art, an encoder/decoder architecture first maps an input data set to a latent space (forward encoding) and subsequently maps the output of the first mapping back to the original space (backward decoding). A contrastive loss function learns the parameters W of a parameterized function $G_W$ in such a way that neighbors are pulled together and non-neighbors are pushed apart. For a family of functions G, parameterized by W, a value of W is found that maps the set of high dimensional inputs to the manifold such that the Euclidean distance between points on the manifold approximates the similarity of the inputs in input space. FIG. 3 shows a Siamese neural network diagram, where $X_1$ and $X_2$ are input vector pairs, Y is the output indicator variable signifying similar or dissimilar input pairs, $EN_1$ and $EN_2$ are encoder networks with the same weights W, i.e., they are the same network. $\|-\|_2$ represents contrastive loss.

In 220, the trained encoder network is isolated. Those skilled in the art understand that an encoder neural network model is nested inside an outer neural network model. The coefficients in both models are determined by minimizing the prediction error of the outer model. Once training is completed, the outer model is no longer needed and the inner encoder network is written to disk. The trained encoder network is now ready to be used for a network/daypart similarity comparison.

An exemplary implementation of the encoder network in python programming language using the keras library is shown below:

```
input=Input (shape=input shape)
x=Dense (128, activation–'relu')(input)
x=Dropout (0.2)(x)
x=Dense (2, activation='relu')(x)
model=Model (inputs=[input], outputs=[x])
```

The method 200 is executed only once to train the encoder network.

Figure 4:
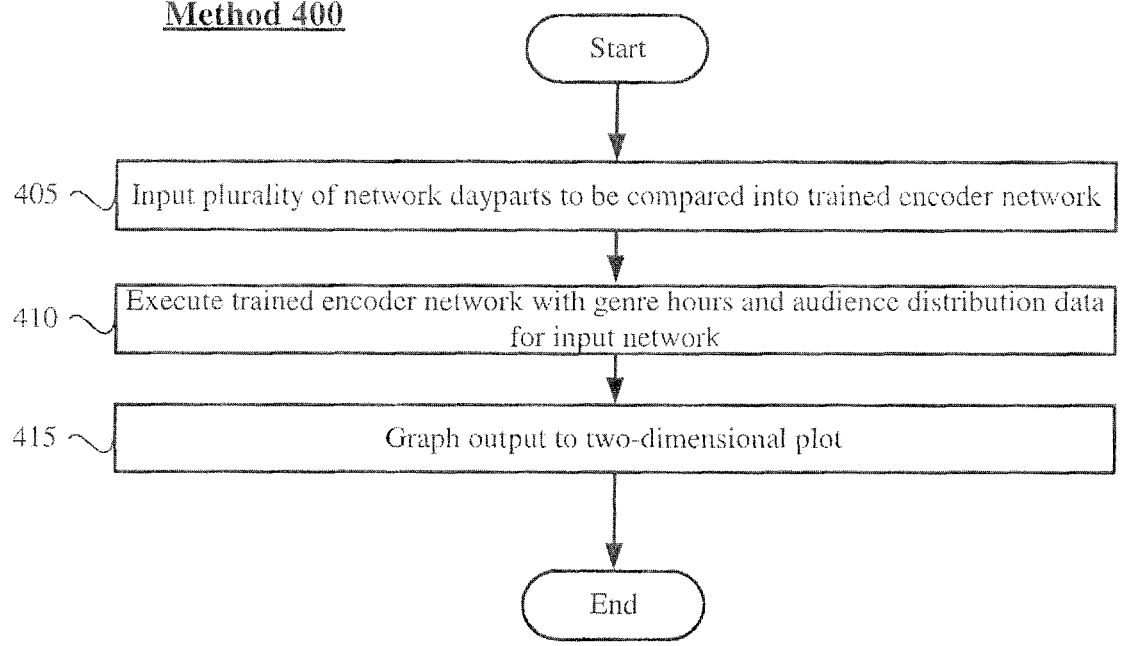
FIG. 4 shows a method for generating a content similarity comparison for network dayparts and plotting the output according to various exemplary embodiments of the present disclosure.

FIG. 4 shows a method 400 for generating a content similarity comparison for network dayparts and plotting the output according to various exemplary embodiments of the present disclosure.

In 405, a plurality of network dayparts to be compared are input to the computing device 105 via e.g. the user interface 125. The programming and audience data for the dayparts (converted to the similarity features discussed above) are used as the model input.

In 410, the trained encoder network generated in the method 300 is executed with the genre hours and audience distribution data for the networks input in step 405. As discussed previously, the trained encoder network pulls similar network dayparts closer together and pushes dissimilar network dayparts further apart.

Figure 5:
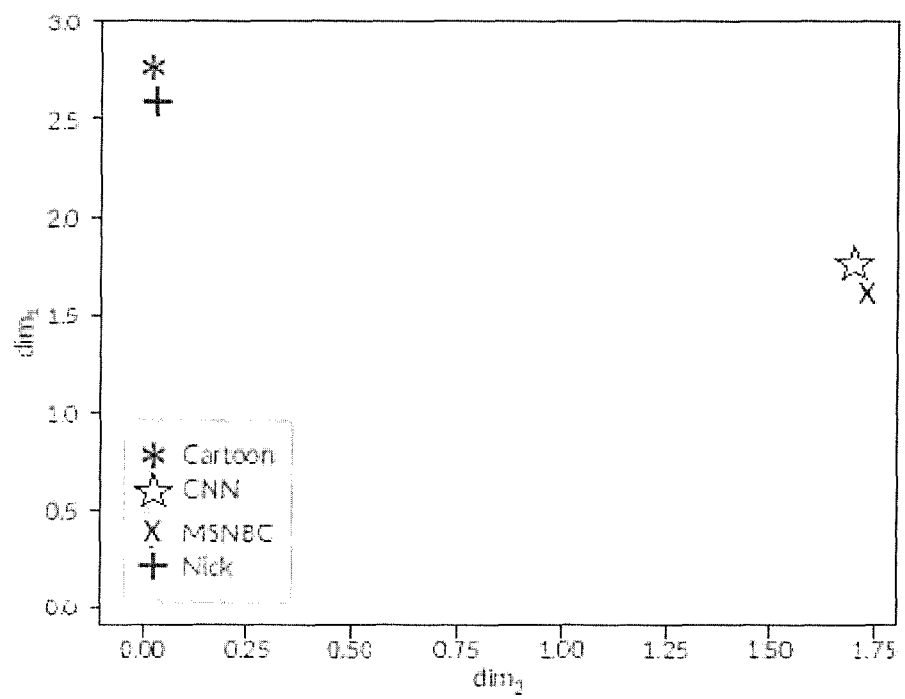
FIG. 5 shows an exemplary scatterplot output for the method of FIG. 4.

In 415, the output of the execution of the encoder network is graphed on a two-dimensional plot. The networks input in step 405 are plotted in the graphical display so that similar networks are short Euclidean distances away from each other and dissimilar networks are long Euclidean distances away from each other. FIG. 5 shows an exemplary scatterplot output for the method of FIG. 4, where four networks (Cartoon Network®, CNN®, MSNBC® and Nickelodeon®) are compared for similarity. However, any number of networks may be compared.

The above-described embodiment is directed to comparing a same daypart across different networks. However, the exemplary embodiments are not limited to this specific implementation. For example, the compared dayparts need not overlap in time. A first daypart for a network may be compared to a second, non-overlapping daypart for the same network, or a first daypart for a first network may be compared to a second, non-overlapping daypart for a second network. In another embodiment, a single network daypart may be input to the model and one or more most-similar network dayparts may be generated and presented to the user. The trained encoder network may be used for comparing network content in additional ways, as would be known to a person skilled in the art.

It will be apparent to those skilled in the art that various modifications may be made to the present disclosure, without departing from the spirit or the scope of the exemplary embodiments. Thus, it is intended that the present disclosure cover modifications and variations of the exemplary embodiments provided they come within the scope of the appended claims and their equivalent.

The invention claimed is:

1. A method, comprising:
generating first training data comprising groupings of similar broadcast networks and groupings of dissimilar broadcast networks, wherein each grouping of similar broadcast networks includes a pair of broadcast networks identified as similar to one another and wherein each grouping of dissimilar broadcast networks includes a pair of broadcast networks identified as dissimilar to one another, wherein the broadcast networks used in the groupings of similar and dissimilar broadcast networks are selected from a predetermined set of broadcast networks;
extracting second training data comprising audience data and genre data for time segments of network broadcasts, wherein the second training data comprises the audience data and the genre data for a predetermined time segment of a network broadcast on each broadcast network of the predetermined set of broadcast networks;

training an encoder neural network based on the first and second training data;

executing the trained neural network with input data comprising at least a first network broadcast time segment, wherein the input data for the trained neural network comprises data for a broadcast during a first time segment on a first network from the predetermined set of networks; and determining a similarity measure between the first network broadcast time segment and a second network broadcast time segment, wherein the trained neural network outputs the similarity measure between the first network broadcast time segment and a second network broadcast time segment, wherein the second network broadcast time segment comprises data for a broadcast during a second time segment on a second network from the predetermined set of networks.

2. The method of claim 1, wherein the trained neural network is executed with input data comprising the first and second network broadcast time segments and at least one additional third network broadcast time segment, the trained neural network determining similarity measures between the first, second and third network broadcast time segments.

3. The method of claim 2, further comprising:
graphing the network broadcast time segment inputs on a two-dimensional plot where similar network broadcast time segments are mapped to the plot at short distances from each other and dissimilar network broadcast time segments are mapped to the plot at long distances from each other.

4. The method of claim 1, further comprising:
determining a network broadcast time segment from a predetermined set of network broadcast time segments having a highest degree of similarity to the first network broadcast time segment.

5. The method of claim 1, wherein the audience data includes audience demographic distribution data and the genre data includes genre distribution data.

6. The method of claim 5, wherein the second training data is extracted as n-dimensional vectors of a predetermined number of similarity descriptors for network broadcast time segments.

7. The method of claim 6, wherein the network broadcast time segments are characterized with 62 similarity descriptors.

8. The method of claim 1, wherein the first training data is generated manually or is generated based on a comparison of network program genres.

9. The method of claim 1, wherein the encoder neural network is a Siamese neural network.

10. A system, comprising:
a memory storing first training data comprising groupings of similar broadcast networks and groupings of dissimilar broadcast networks and second training data comprising audience data and genre data for time segments of network broadcasts, wherein each grouping of similar broadcast networks includes a pair of broadcast networks identified as similar to one another and wherein each grouping of dissimilar broadcast networks includes a pair of broadcast networks identified as dissimilar to one another, wherein the broadcast networks used in the groupings of similar and dissimilar broadcast networks are selected from a predetermined set of broadcast networks, wherein the second training data comprises the audience data and the genre data for a predetermined time segment of a network broadcast on each broadcast network of the predetermined set of broadcast networks;

a processor training an encoder neural network based on the first and second training data, executing the trained neural network with input data comprising at least a first network broadcast time segment, wherein the input data for the trained neural network comprises data for a broadcast during a first time segment on a first network from the predetermined set of networks, and determining a similarity measure between the first network broadcast time segment and a second network broadcast time segment, wherein the trained neural network outputs the similarity measure between the first network broadcast time segment and a second network broadcast time segment, wherein the second network broadcast time segment comprises data for a broadcast during a second time segment on a second network from the predetermined set of networks.

11. The system of claim 10, wherein the trained neural network is executed with input data comprising the first and second network broadcast time segments and at least one additional third network broadcast time segment, the trained neural network determining similarity measures between the first, second and third network broadcast time segments.

12. The system of claim 11, further comprising:
a display displaying a two-dimensional plot,
wherein the processor further graphs the network broadcast time segment inputs on the two-dimensional plot where similar network broadcast time segments are mapped to the plot at short distances from each other and dissimilar network broadcast time segments are mapped to the plot at long distances from each other.

13. The system of claim 10, wherein the processor further determines a network broadcast time segment from a predetermined set of network broadcast time segments having a highest degree of similarity to the first network broadcast time segment.

14. The system of claim 10, wherein the audience data includes audience demographic distribution data and the genre data includes genre distribution data.

15. The system of claim 14, wherein the second training data is extracted as n-dimensional vectors of a predetermined number of similarity descriptors for network broadcast time segments.

16. The system of claim 15, wherein the network broadcast time segments are characterized with 62 similarity descriptors.

17. The system of claim 10, wherein the first training data is generated manually or is generated based on a comparison of network program genres.

18. The system of claim 10, wherein the encoder neural network is a Siamese neural network.

\* \* \* \* \*